United States Patent [19]

Fujisaki et al.

[11] Patent Number: 5,119,534
[45] Date of Patent: Jun. 9, 1992

[54] METHOD OF FORMING COUPLING HEAD PORTIONS IN PRODUCTION OF SLIDE FASTENER COUPLING ELEMENT

[75] Inventors: Yoshinori Fujisaki; Sakae Aimono, both of Toyama, Japan

[73] Assignee: Yoshida Koygyo K.K., Tokyo, Japan

[21] Appl. No.: 675,173

[22] Filed: Mar. 26, 1991

[30] Foreign Application Priority Data

Mar. 27, 1990 [JP] Japan .................... 2-77283

[51] Int. Cl.⁵ ............................. B21D 53/52
[52] U.S. Cl. ......................... 29/410; 24/394
[58] Field of Search ............. 29/410, 408, 769; 24/391, 394

[56] References Cited

U.S. PATENT DOCUMENTS

| 3,047,923 | 8/1962 | Wilcken | 24/391 |
|---|---|---|---|
| 3,168,606 | 2/1965 | Burbank | 264/181 |
| 3,197,537 | 7/1965 | Hansen | 29/410 |
| 4,325,184 | 4/1982 | Omori | 29/766 |

FOREIGN PATENT DOCUMENTS 0099063 2/1984 European Pat. Off.
943801 12/1963 United Kingdom.

Primary Examiner—P. W. Echols
Attorney, Agent, or Firm—Hill, Van Santen, Steadman & Simpson

[57] ABSTRACT

In a method of forming coupling head portions on a monofilament of thermoplastic synthetic resin for production of a slide fastener coupling element, the monofilament is stamped from one side to form recessed small-thickness portions bulging from the other side of the monofilament, and then the monofilament is bent at opposite ends of each of the recessed small-thickness portions in such a manner that the concave side of each small-thickness portions faces outwardly.

1 Claim, 5 Drawing Sheets

METHOD OF FORMING COUPLING HEAD PORTIONS IN PRODUCTION OF SLIDE FASTENER COUPLING ELEMENT

BACKGROUND OF THE INVENTION

1. Field of the Invention

This invention relates to a method of forming coupling head portions on a monofilament of thermoplastic synthetic resin in the production of a slide fastener coupling element.

2. Description of the Related Art

A method for stamping a monofilament of synthetic resin for slide fastener coupling elements is known from, for example, Japanese Patent Publication 8902/1988. In the known method, as shown in FIGS. 13(a) and 13(b) of the accompanying drawings, a monofilament A of synthetic resin is continuously stamped on opposite sides by a pair of rotating rollers B, B to provide longitudinally spaced successive pairs of depressed small-thickness portions C, C, as the monofilament A is continuously supplied between the two rollers B, B. The stamped monofilament A is then continuously bent at opposite ends of the individual small-thickness portion C to form coupling head portions of a coiled filamentary coupling element.

Practically, however, the stamped monofilament A tends to be bent along the individual small-thickness portion on the side toward an imaginary center line passing centrally of its length, the gap between the upper and lower leg portions on the side toward the coupling head portion is apt to be reduced. In a slide fastener using the resulting coupling elements, smooth coupling and uncoupling of a pair of opposite rows of coupling head portions cannot be performed when a slider is moved on and along the slide fastener. Also it is difficult to move the slider smoothly. Further, after coupling, the slide fastener would not be kept in a stably coupled posture.

SUMMARY OF THE INVENTION

It is therefore an object of this invention to provide a method of forming coupling head portions, in the production of a slide fastener coupling element, in such a manner that smooth closing and opening of a slide fastener can be performed by smooth movement of a slider and that after closing, the mating coupling elements of the slide fastener can be kept in a stably coupled posture.

According to the invention, there is provided a method of forming coupling head portions on a monofilament of thermoplastic synthetic resin for production of a slide fastener coupling element, comprising: forming on the monofilament, by stamping the monofilament from one side, recessed small-thickness portions each being concave at one side and convex at the other side and bulging at the convex side from the circumferential surface of the monofilament; and bending the monofilament at opposite ends of each of the recessed small-thickness portions in such a manner that the concave side of each recessed small-thickness portion faces outwardly.

The above and other advantages, features and additional objects of this invention will be manifest to those versed in the art upon making reference to the following detailed description and the accompanying drawings in which some preferred embodiments incorporating the principles of this invention are shown by way of illustrative examples.

DETAILED DESCRIPTION

Embodiments of this invention will now be described with reference to the accompanying drawings. Throughout the embodiments, a coiled or zigzag filamentary coupling element manufactured by this invention has coupling head portions, sets of upper and lower leg portions, and connecting or turnover portions each extending between the leg portions of the adjacent sets.

FIGS. 1(a) through 1(d) shows the manner in which prospective coupling head portions of a coiled filamentary coupling element for a slide fastener are formed according to a first embodiment of the method of this invention. In the first embodiment, after having been previously shaped so as to have at least prospective coupling head portions (described below), a monofilamentary starting material is bent at spaces so as to be wound around a mandrel (described below) into a coiled filamentary coupling element.

Figure 1A:
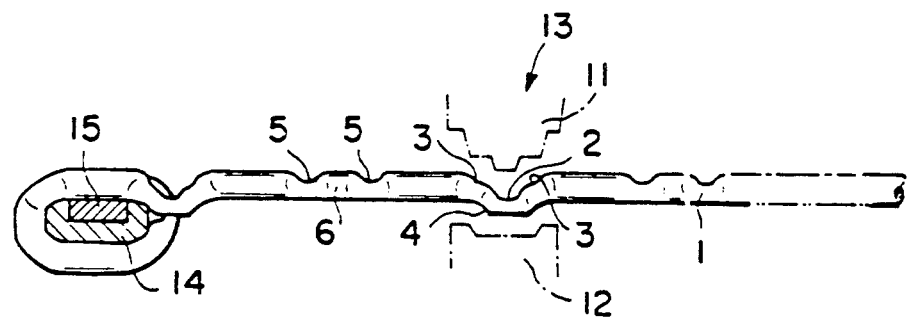
FIGS. 1(a) through 1(d) show the manner in which a stamped monofilament having prospective coupling head portions and prospective turnover portions is progressively wound around a mandrel, in the production of a coiled coupling element, according to a first embodiment of the method of this invention.
Figure 1B:
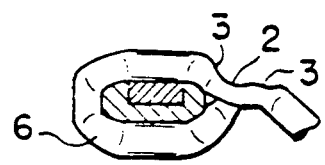
Figure 1C:
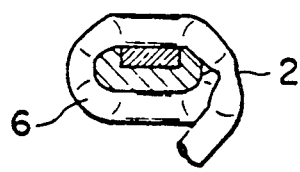
Figure 1D:
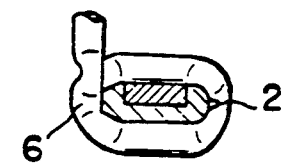
Figure 2:
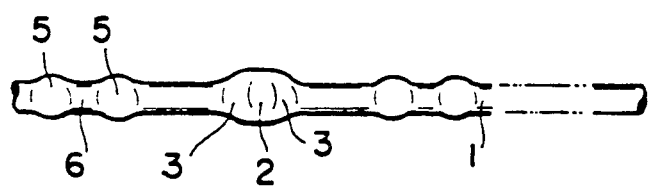
FIG. 2 is a fragmentary plan view of the stamped monofilament in the first embodiment.
Figure 3:
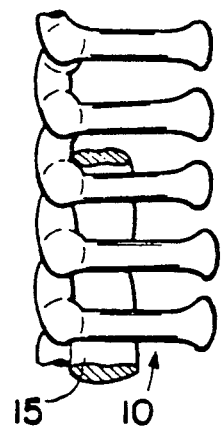
FIG. 3 is a fragmentary plan view of a finished coiled filamentary coupling element.

In FIGS. 1(a) and 2, reference numeral 1 designates a starting material, for forming a coiled filamentary coupling element 10 for a slide fastener, in the form of a monofilament of thermoplastic synthetic resin such as polyamid or polyester. Specifically, the monofilament 1 is previously stamped, by a suitable means, such as a stamping tool 13 as indicated by phantom lines in FIG. 1(a), a pair of stamping rollers or the like, so as to have a coupling head portion 2 and a pair of flattened portions (hereinafter also called "first flattened portions") 3, 3 facilitating bending. The stamping tool 13 includes an upper stamping tooth 11 in the shape of a two-step chevron and a lower stamping tooth 12 in the shape of a recess. The upper and lower stamping teeth 11, 12 cooperate with each other to form a recessed small-thickness portion on one side of the monofilament 1 and a bulged portion for on the other side, with the individual coupling head portion 2 being disposed at the deepest and central area of the recessed small thickness portion. As shown in FIG. 2, the step portions on the opposite sides of the deepest and central area project from opposite circumferential surfaces of the monofilament 1 to constitute the pair of flattened portions 3, 3 contiguous to the coupling head portion 2.

Reference numerals 5, 5 in FIGS. 1(a) and 2 designate a pair of flattened portions (hereafter also called "second flattened portions") 5, 5 which is formed, by means of non-illustrated stamping teeth independent of the stamping tool 13, at opposite sides of a prospective turnover portion 6. The individual flattened portion 5 bulges in opposite directions from the circumferential surface of the monofilament 1, as shown in FIG. 2.

As shown in FIGS. 1(a) through 1(d), the thus stamped monofilament 1, with the concave side of each recessed small-thickness portion facing outwardly, is wound around a mandrel 14 so that the concave side of each recessed small-thickness portion is remote from the turnover portions. The mandrel 14 is substantially rectangular in cross section and receives a core cord 15 for longitudinal movement. During that time, the stamped monofilament 1 is bent at the flattened portions 3, 3 of the individual prospective coupling head portion 2 and the flattened portions 5, 5 of the individual prospective turnover portion 6 to thereby form coiled coupling elements with precision.

Figure 5:
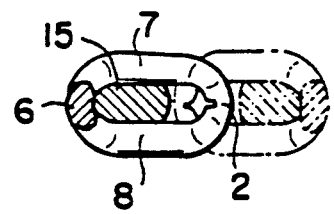
FIG. 5 is a transverse cross-sectional view of FIG. 3, with a mating coiled filamentary coupling element shown in phantom lines.

Since there are the flattened portions 3, 3 at opposite sides of the individual prospective coupling head portion 2, accurate bending can be performed at opposite ends of the coupling head portion 2. At the same time, because the portions inside the bends are compressed, a repulsion occurs to create a wide gap between upper and lower leg portions 7, 8 at the side toward the coupling head portion 2, as shown in FIG. 5, so that the monofilament can be bent so as to guarantee smooth coupling of a pair of mating coupling elements of a slide fastener. Likewise, since the monofilament is bent at the flattened portions 5, 5 on opposite sides of the individual prospective turnover portion 6, a precise coiled filamentary coupling element 10 can be formed. Then the coiled filamentary coupling element 10, with the core cord 15 threaded therethrough, is continuously discharged from the distal end of the mandrel 14 as a finished slide fastener coupling element.

Figure 4:
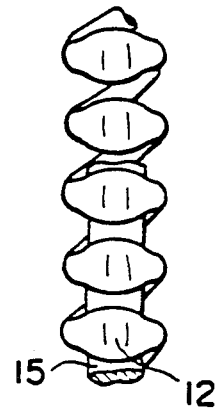
FIG. 4 is a fragmentary front view of FIG. 3.

FIG. 4 shows the coupling head portions 2 of the thus produced coiled filamentary coupling element 10. Since the coupling head portion 2 is formed so as to bulge from opposite sides of the monofilament 1 as shown in FIG. 2, the resulting coupling element 10 can be coupled with a mating coupling element firmly due to the adequate gap between the upper and lower leg portions 7, 8, thus improving the coupling function of a slide faster.

In this embodiment, the core cord 15, which is received in and through the mandrel 14, is threaded through the coiled filamentary coupling element 10 while the latter is progressively manufactured. Alternatively, the core cord 15 may be omitted from the coiled filamentary coupling element 10.

Figure 6A:
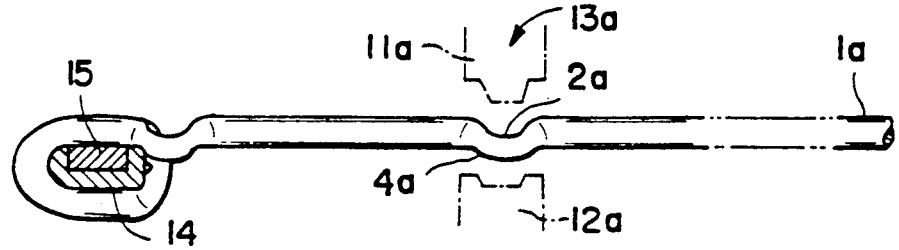
FIGS. 6(a) through 6(c) show the manner in which a stamped monofilament having only prospective coupling head portions is progressively wound around a mandrel, in the production of a coiled filamentary coupling element, according to a second embodiment of the method of this invention.
Figure 6B:
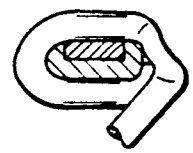
Figure 6C:
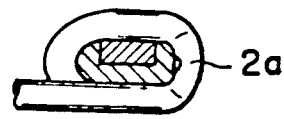

FIGS. 6(a) through 6(c) show a second embodiment, in which a monofilament 1a is stamped so as to have only prospective coupling head portions 2a and the stamped monofilament 1a is bent and wound around a mandrel 14 into a coiled filamentary coupling element. Specifically, the coupling head portions 2a are formed, by a stamping tool 13a composed of a pair of mating stamping teeth 11a, 12a as indicated by phantom lines in FIG. 1(a), in such a manner that a recessed small-thickness portion for each coupling head portion 2a is concave at one side and convex at the other side and bulges at lateral sides from the opposite circumferential surface of the monofilament 1a. The resulting monofilament 1a is bent and wound around the mandrel 14 in such a manner that the concave side of each recessed portion faces outwardly.

Figure 7:
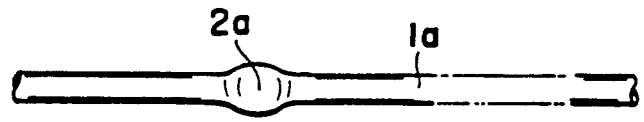
FIG. 7 is a fragmentary plan view of the stamped monofilament in the second embodiment.
Figure 8:
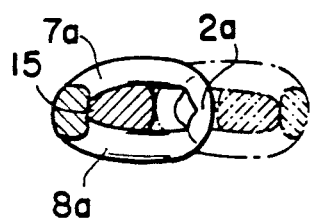
FIG. 8 is a transverse cross-sectional view of a finished coiled filamentary coupling element in the second embodiment, with a mating coiled filamentary coupling element shown in phantom lines.
Figure 9:
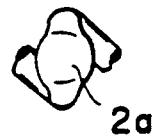
FIG. 9 is a fragmentary front view of FIG. 8.

In the second embodiment, like the first embodiment, the individual coupling head portion 2a bulges from the opposite side 4a of the monofilament 1a, accurate bending is performed at the opposite ends of each coupling head portion 2a. At the same time, because the portions inside the bends are compressed, a repulsion occurs to create a wide gap between upper and lower leg portions 7a, 8b at the side toward the coupling head portion 2, as shown in FIG. 8, so that the monofilament can be bent so as to guarantee smooth coupling of a pair of mating coupling elements of a slide fastener. Then the finished coiled filamentary coupling element is continuously discharged from the distal end of the mandrel 14. FIG. 7 is a fragmentary plan view of the stamped monofilament 1a, showing the prospective coupling head portion 2a in the form of a flattened portion bulging from opposite lateral sides of the stamped monofilament 1a. Thus the resultant coupling head portion 2a has an enlarged width so that firm coupling of a slide fastener can be realized, as shown in FIG. 9.

Figure 10:
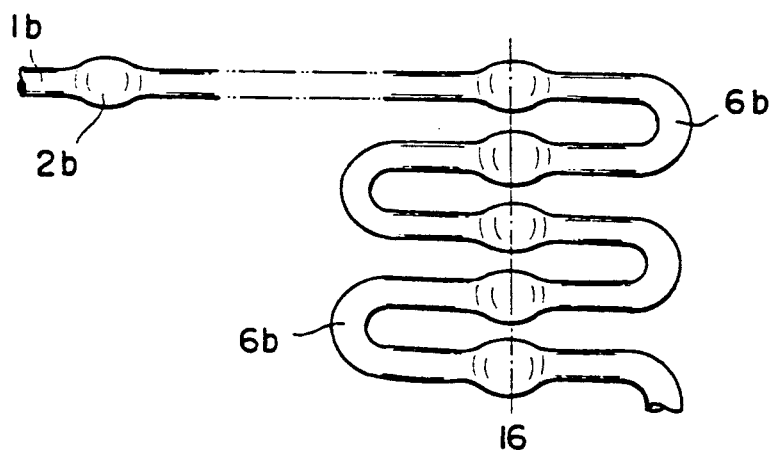
FIG. 10 shows the manner in which a stamped monofilament having only prospective coupling head portions is bent into a meandering filamentary element, in the production of a zigzag filamentary coupling element, according to a third embodiment of the method of this invention.
Figure 11:
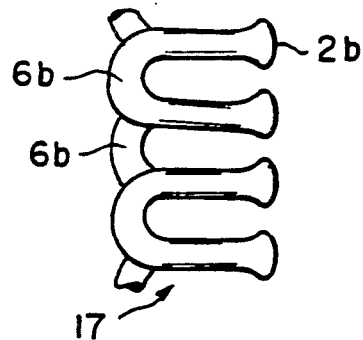
FIG. 11 is a fragmentary plan view of a finished zigzag filamentary coupling element.
Figure 12:
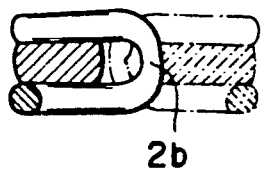
FIG. 12 is a transverse cross-sectional view of FIG. 11, with a mating coiled filamentary coupling element shown in phantom lines.
Figure 13A:
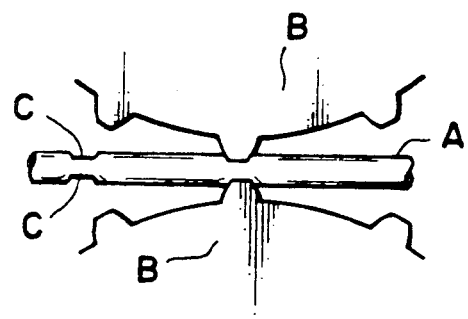
FIG. 13(a) is a fragmentary side view the manner in which coupling head portions are formed on a monofilament, by means of a pair of stamping rollers, according to a prior art method.
Figure 13B:
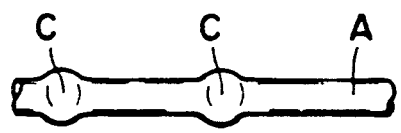
FIG. 13(b) is a fragmentary plan view of the monofilament stamped according to the prior art method.

FIGS. 10 through 12 show a third embodiment, in which a monofilament 1b is stamped so as to have only recessed small-thickness portions as prospective coupling head portions 2b, each recessed small-thickness portion being concave at one side and convex at the other side and bulging at the convex side from the circumferential surface of the monofilament 1b. With the concave side of each recessed small-thickness portion facing outwardly, the stamped monofilament 1b is then bent at regular distances in a meandering pattern such that each prospective coupling head portion 2b is disposed centrally between a pair of adjacent turnover portions 6b on opposite sides and such that the successive prospective coupling head portions 2b are arranged on an imaginary bending line 16. This meandering monofilament is then folded over itself by bending along the bending line 16, thereby providing a finished zigzag filamentary coupling element 17 shown in FIG. 11. In this zigzag filamentary coupling element 17, an unnumbered core cord may be laid in between upper and lower leg portions. In the absence of such a core cord, an inner longitudinal edge of the slide fastener tape is sandwiched between the upper and lower leg portions.

In this embodiment, like the second embodiment, the monofilament 1b is bent accurately at opposite ends of the bulged portions for the individual prospective coupling head portions 2b. At the same time, because the portions inside the bends are compressed, a repulsion occurs to create a wide gap between the upper and lower leg portions at the side toward the coupling head portion 2b, as shown in FIG. 12, so that the monofilament can be bent so as to guarantee smooth coupling of a pair of mating coupling elements of a slide fastener.

In the illustrated embodiments, the finished coiled or zigzag filamentary coupling element, with or without a laid-in core cord, is attached to a slide fastener tape by sewing. Alternatively, the filamentary coupling element may be woven into a slide fastener tape.

According to this invention, partly since the prospective coupling head portions each in the form of a recessed small-thickness portion is formed on the monofilament so as to bulge at the convex side from the circumferential surface of the monofilament, and partly since the resulting monofilament is bent at opposite ends of each prospective coupling head portion in such a manner that the concave side of each recessed small-thickness portion faces outwardly, easy and accurate bending can be performed, thus causing an improved degree of precision of the finished filamentary coupling element. Further, because the portions inside the bends are compressed, a repulsion occurs to create a wide gap between the upper and lower leg portions at the side toward the individual coupling head portion so that the monofilament can be bent so as to enable smooth coupling of a pair of mating coupling elements of a slide fastener. During coupling and uncoupling of the mating coupling elements, a slider also can be moved smoothly. After having been coupled, the mating coupling elements of the slide fastener can be kept in a stably coupled posture.

What is claimed is:

1. A method of forming coupling head portions on a monofilament of thermoplastic synthetic resin for production of a slide fastener coupling element, comprising:

(a) forming on he monofilament, by stamping the monofilament from one side, recessed small-thickness portions each being concave at one side and convex at the other side and building at lateral sides from a circumferential surface of the monofilament; and (b) bending the monofilament at opposite ends of each of the recessed small-thickness portions in such a manner that said concave side of each said recessed small-thickness portion faces outwardly.

* * * * *